(12) United States Patent  (10) Patent No.: US 9,114,710 B2
Makino  (45) Date of Patent: Aug. 25, 2015

(54) POWER SUPPLY CONTROL APPARATUS FOR VEHICLE

(75) Inventor: Seiko Makino, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 806 days.

(21) Appl. No.: 13/444,058

(22) Filed: Apr. 11, 2012

(65) Prior Publication Data

US 2012/0274131 A1 Nov. 1, 2012

(30) Foreign Application Priority Data

Apr. 28, 2011 (JP) ................. 2011-101706

(51) Int. Cl.
*B60L 3/00* (2006.01)
*B60L 3/04* (2006.01)

(52) U.S. Cl.
CPC ............... *B60L 3/0069* (2013.01); *B60L 3/04* (2013.01); *B60L 2240/12* (2013.01)

(58) Field of Classification Search
USPC ............................................... 307/9.1
See application file for complete search history.

(56) References Cited

U.S. PATENT DOCUMENTS

| 5,686,839 | A  | 11/1997 | Takagi |
| 2007/0013382 | A1 | 1/2007 | Hinz et al. |
| 2010/0308841 | A1 | 12/2010 | Karrer et al. |
| 2012/0109435 | A1 | 5/2012 | Mikulec et al. |

FOREIGN PATENT DOCUMENTS

| CN | 101722859 A | 6/2010 |
| DE | 102006031874 A1 | 2/2007 |
| DE | 102007046483 A1 | 4/2009 |
| DE | 102009002991 A1 | 11/2010 |
| JP | 03293928 A | 12/1991 |
| JP | 2003-9304 A | 1/2003 |
| JP | 2007-147364 A | 6/2007 |
| JP | 2008-29165 A | 2/2008 |

(Continued)

OTHER PUBLICATIONS

Notification of Decision to Grant Patent Right mailed Jul. 15, 2014 in corresponding Chinese Patent Application No. 201210132670.X (with an English translation) (4 pages).
Notice of Allowance mailed Oct. 14, 2014 in corresponding Japanese Patent Application No. 2011-101706 (1 page).
Notice of Allowance mailed Nov. 18, 2014 in corresponding German Patent Application No. 10 2012 206 570.9 (17 pages).

(Continued)

*Primary Examiner* — Rexford Barnie
*Assistant Examiner* — Dru Parries
(74) *Attorney, Agent, or Firm* — Rothwell, Figg, Ernst & Manbeck, P.C.

(57) ABSTRACT

A power supply control apparatus for use in a vehicle is provided for ensuring necessary running and workability when an electrical insulation degradation of a high-voltage part is detected. A vehicle 100 having a high-voltage battery 14 and an inverter 17 is provided with: an electrical insulation degradation sensor 25 for detecting an electrical insulation degradation of the high-voltage part; main relays 22 and 23 for cutting off the supply of the power to the high-voltage part; a vehicle speed detector 16 for detecting a running speed Sn of the vehicle; and a controller 15 for causing the main relays to cut off the supply of the power as a power supply cutoff condition, when the electrical insulation degradation sensor detects the electrical insulation degradation of the high-voltage part and the running speed of the vehicle detected by the vehicle speed detector is lower than a preset speed St.

7 Claims, 4 Drawing Sheets

(56) References Cited

FOREIGN PATENT DOCUMENTS

| JP | 2008-289313 | A | 11/2008 |
| JP | 2008289313 | A | 11/2008 |
| JP | 2010-256023 | A | 11/2010 |
| JP | 2010256023 | A | 11/2010 |

OTHER PUBLICATIONS

German Office Action with English Translation from application No. DE102012206570.9, dated Jan. 24, 2014, 11 pages.

Office Action issued in corresponding Chinese Application No: 201210132670.X, mailed Mar. 4, 2014 with an English translation (17 pages).

POWER SUPPLY CONTROL APPARATUS FOR VEHICLE

CROSS-REFERENCE

This document claims priority to Japanese Application Number 2011-101706, filed Apr. 28, 2011, the entire content of which is hereby incorporated by reference.

TECHNICAL FIELD

The present invention relates to a power supply control apparatus for use in a vehicle, and in particular, relates to a power supply control apparatus for cutting off the supply of the power promptly when an electrical insulation degradation of a high-voltage part is detected.

BACKGROUND ART

Generally, a vehicle is equipped with a battery for supplying electric energy to various kinds of electric component parts. Among such components, there are some high-voltage parts. For example, a hybrid vehicle that runs on combination of an electric motor and an internal combustion engine or an electric vehicle that runs only on the electric motor is equipped with not only the high-voltage parts that operate with a high-voltage direct current power from a high-voltage direct current power supply but also the high-voltage parts that operate by converting, as the electric motor does, the power supply voltage from the high-voltage direct current power supply into alternating current. Since a fuel cell powered vehicle also converts various types of fuel into electricity for running, it is equipped with the high-voltage direct current power supply.

In the vehicle equipped with this type of high-voltage direct current power supply, sufficient electrical insulation is provided so that the high-voltage direct current should not be flown into the power supply or any other high-voltage parts. However, the electrical insulating part may degrade for some reason to cause electric leakage. For this reason, there is a proposal for equipping an apparatus for detecting the electrical insulation degradation in a vehicle (an example is Patent Document 1).

There is another proposal for controlling the running function of the vehicle equipped with a high-voltage power supply to be maintained until the next running operation instruction is given (that is, the ignition key is switched on), instead of restricting its running immediately after the electrical insulation degradation is detected at a high-voltage part (an example is Patent Document 2).

PRIOR ART DOCUMENTS

Patent Documents

Patent Document 1: JP 2010-256023 A
Patent Document 2: JP 2008-289313 A

SUMMARY OF INVENTION

Problem to be Solved

However, in such a vehicle equipped with a high-voltage power supply described in Patent Document 2, the vehicle continues running until the next running operation instruction is given. This may rapidly develop the electrical insulation degradation at the high-voltage part. Besides, if the maintenance operation is conducted for such a vehicle with the electrical insulation degradation occurring at the high-voltage part, before the next running operation instruction is given, in other words, if the maintenance operation is conducted in a state of being capable of running, the part where the electric leakage is occurring would be touched.

On the other hand, if the supply of the power is promptly cut off when the electrical insulation degradation occurs at a high-voltage part in the vehicle equipped with the high-voltage power supply, this will adversely affect the vehicle stability.

Therefore, the present invention has an object to provide a power supply control apparatus for use in a vehicle that can ensure necessary running and workability when an electrical insulation degradation of a high-voltage part is detected.

Solution to the Problem

According to a first aspect of the present invention, in order to solve the above problem, there is provided a power supply control apparatus mounted in a vehicle having a high-voltage part, for controlling supply of power to the high-voltage part, the power supply control apparatus comprising: an electrical insulation degradation detector for detecting an electrical insulation degradation of the high-voltage part; a power supply cutoff unit for cutting off the supply of the power to the high-voltage part; a vehicle speed detector for detecting a running speed of the vehicle; and a power supply controller for causing the power supply cutoff unit to cut off the supply of the power to the high-voltage part, when a first power supply cutoff condition and a second power supply cutoff condition are satisfied, the first power supply cutoff condition being that the electrical insulation degradation detector detects the electrical insulation degradation of the high-voltage part, the second first power supply cutoff condition being that the running speed of the vehicle detected by the vehicle speed detector is lower than a preset speed.

According to a second aspect of the present invention, in addition to the above first aspect, in order to solve the above problem, the power supply control apparatus for use in the vehicle may further comprise a timer for counting a duration of a state of satisfying the first and second power supply cutoff conditions, and the power supply controller may cause the power supply cutoff unit to cut off the supply of the power to the high-voltage part, when a counted time of the timer exceeds a preset time.

According to a third aspect of the present invention, in addition to the above first aspect, in order to solve the above problem, the power supply controller may cause the power supply cutoff unit to cut off the supply of the power to the high-voltage part, when a third power supply cutoff condition is satisfied in addition to the first and second power supply cutoff conditions being satisfied, the third power supply cutoff condition being that the running speed of the vehicle detected by the vehicle speed detector is gradually being lowered.

According to a fourth aspect of the present invention, in addition to the above first aspect, in order to solve the above problem, the vehicle may further comprise an inverter for converting a direct current voltage supplied from a direct current power supply into an alternating current voltage, and the electrical insulation degradation detector may detect the electrical insulation degradation on the direct current power supply side and the electrical insulation degradation on the inverter side, respectively.

According to a fifth aspect of the present invention, in addition to the above fourth aspect, in order to solve the above problem, the power supply controller may have a first setting speed of the electrical insulation degradation on the direct current power supply side and a second setting speed of the electrical insulation degradation on the inverter side, as the preset speeds of the second power supply cutoff condition, and the second setting speed may be lower than the first setting speed.

According to a sixth aspect of the present invention, in addition to the above fourth or fifth aspect, in order to solve the above problem, the power supply control apparatus for use in the vehicle may further comprise a timer for counting a duration of satisfying the first and second power supply cutoff conditions, and the power supply controller may have a first setting time of the electrical insulation degradation on the direct current power supply side and a second setting time of the electrical insulation degradation on the inverter side, as the preset time for causing the power supply cutoff unit to cut off the supply of the power to the high-voltage unit, when a counted time of the timer exceeds the preset time, and the second setting time may be longer than the first setting time.

Advantageous Effects of the Invention

According to the above first aspect of the present invention, when the electrical insulation degradation of the high-voltage part is detected and the detected speed (running speed) of the vehicle is lower than a preset speed, it is determined that the first and second power supply cutoff conditions are satisfied and the supply of the power to the high-voltage part is cut off. It is therefore possible to continue running before the vehicle speed is lowered. For example, when the vehicle runs at a speed where there is no problem even if the supply of the power is cut off, it is possible to cut off the supply of the power to the high-voltage part where the electrical insulation degradation occurs. This result will not adversely affect the security of the vehicle stability. It is also possible to conduct the maintenance operation without an electric leakage state.

According to the above second aspect of the present invention, when the state of satisfying the above first and second power supply cutoff conditions are satisfied continues with exceeding the setting time, the supply of the power to the high-voltage part is cut off. Therefore, since the supply of the power to the high-voltage part is cut off in a state where the vehicle movement is stable, it is possible to reduce the influence to the running even if the supply of the power is cut off. It is possible to avoid the cutoff of the supply of the power in a running state where the vehicle repeats acceleration and deceleration, and it is possible to cut off the supply of the power to the high-voltage part when the vehicle is certainly about to stop.

According to the above third aspect of the present invention, when the electrical insulation degradation at the high-voltage part is detected, it is determined that the above first to third power supply cutoff conditions are satisfied the power supply cutoff is determined that the detected vehicle speed is lower than the setting speed and the vehicle is decelerating and the supply of the power to the high-voltage part is cut off. As a result of cutting off the supply of the power to the high-voltage part, no response is given to a driver's acceleration operation. Therefore, the vehicle starts decelerating. Since the supply of the power is cut off in the deceleration state, it is possible to suppress an unexpected shock to be applied to a driver as compared to a case where the supply of the power to the high-voltage part is cut off in the acceleration state. It is also possible to cut off the supply of the power to the high-voltage part, when the vehicle is certainly about to stop.

According to the above fourth aspect of the present invention, the electrical insulation degradation is respectively detected on the direct current power supply side and the inverter side, and it is determined whether or not the first and second power supply cutoff conditions are satisfied to conduct a power supply cutoff control. Thus, it is made possible to control even the electrical insulation degradation on the inverter (alternating current power supply) side in the same manner. Then, running is disabled and the electric leakage is eliminated for the maintenance operation.

According to the above fifth aspect of the present invention, when the electrical insulation degradation occurs on the inverter side and the detected vehicle speed is lower than the second setting speed that is lower than the first setting speed of the direct current power supply side, the second power supply cutoff condition is determined. Accordingly, even if noise may be generated on the inverter side more easily than the direct current power supply side, the electrical insulation degradation on the alternating current power supply side is detected with high reliability and certainty and the second power supply cutoff condition is determined to cut off the supply of the power.

According to the above sixth aspect of the present invention, when the electrical insulation degradation occurs at the inverter side, the determination condition is set such that the first and second power supply cutoff conditions continue with exceeding the second setting time longer than the first setting time of the direct current power supply side. Accordingly, even if noise may be generated on the inverter side more easily than the direct current power supply side, it is possible to temporarily avoid the determination condition satisfying the first and second power supply cutoff conditions and prevent the cutoff of the supply of the power.

DESCRIPTION OF EMBODIMENTS

First Embodiment

Figure 1:
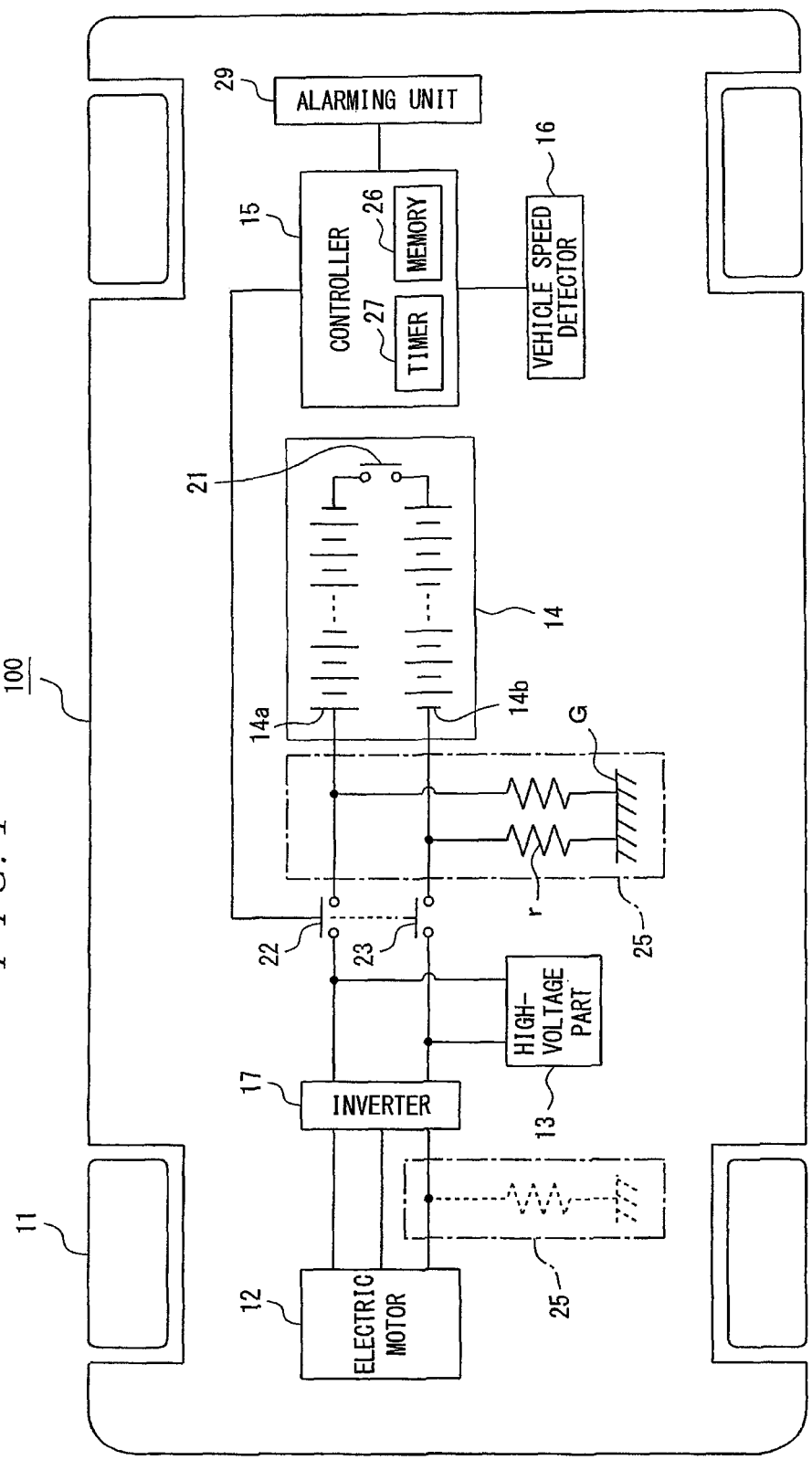
FIG. 1 is a view illustrative of an example of a vehicle equipped with a first embodiment of a vehicle power supply control apparatus according to the present invention.
Figure 2:
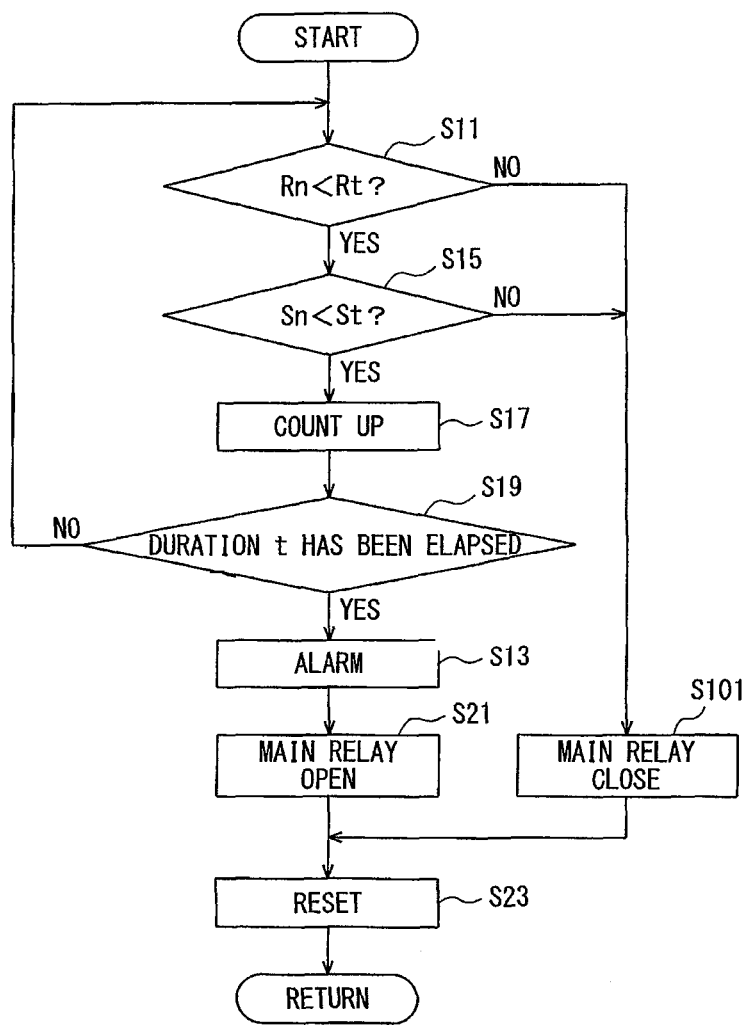
FIG. 2 is a flowchart illustrative of a control process of cutting off the supply of the power.
Figure 3:
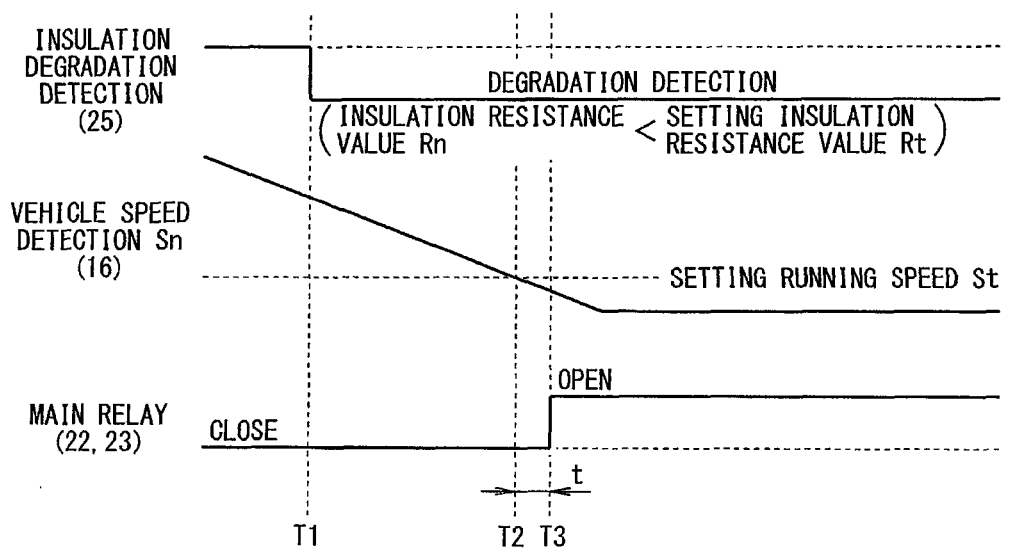
FIG. 3 is a timing chart illustrative of a state of carrying out the control process of cutting off the supply of the power.

Hereinafter, embodiments of the present invention will be described in detail with reference to the drawings. FIG. 1 to FIG. 3 are views illustrative of an example of a vehicle equipped with a first embodiment of a vehicle power supply control apparatus according to the present invention.

In FIG. 1, a vehicle 100 is provided with: an electric motor 12 equipped as a driving source for rotating wheels 11; a high-voltage parts 13 that operates with a high-voltage direct current power; a high-voltage battery (storage battery) 14 for charging a high-voltage power supply (current) that can be supplied to and consumed by the electric motor 12 or the high-voltage parts 13; and a controller 15 for enabling the running of the vehicle 100 by controlling each of vehicle components including the electric motor 12 and the high-voltage parts 13 in a unified manner. The vehicle 100 is constructed as a so-called eco car (i.e., ecology car) capable of running on electric energy.

The controller 15 executes a control process including a power supply control, to be described later, by performing arithmetic processing and the like while the CPU is temporarily storing various kinds of information in accordance with a control program and setting values. For example, the controller 15 is connected to a vehicle speed detector 16 for detecting the speed (vehicle speed) of the running vehicle 100 by detecting the rotational speed at the midpoint of coupling the driving shaft of the wheel 11 and the rotary shaft of the electric motor 12. Additionally, the controller 15 controls an inverter 17 to supply an alternating voltage to the electric motor 12 and rotates the wheels 11, so that the vehicle 100 runs at a desired speed. That is, the controller 15 constitutes a vehicle power supply control apparatus for supplying the power to the electric motor 12, the high-voltage parts 13, and the like, as high-voltage part. Specifically, at the time of coasting without the accelerator pedal being pressed, the controller 15 causes the rolling motion of the wheels 11 to rotate the rotary shaft of the electric motor 12 so as to function the electric motor 12 as a power generator, whereby regenerative energy (electric energy) is collected to charge the high-voltage battery 14 via the inverter 17. In addition, a switch 21 is provided for manually cut off the high voltage at the time of performing high-voltage operations or the like.

Furthermore, an electrical insulation degradation sensor (electrical insulation degradation detector) 25 is connected to the high-voltage battery 14 so as to confirm whether or not there is an electrical insulation degradation of a positive terminal 14a side and a negative terminal 14b side, respectively. The controller 15 executes an electrical insulation degradation handling process program to make main relays 22 and 23 open (cut off) in the former stage of the electric motor 12 and the high-voltage parts 13, based upon the detection result of the electrical insulation degradation sensor 25, thereby to cut off supply of the high-voltage power output from the high-voltage battery 14. Specifically, the main relays 22 and 23 are closed (conducting), in a steady state, to be capable of supplying the high-voltage power output from the high-voltage battery 14.

The controller 15 executes an electrical insulation degradation handling process procedure (process method) in accordance with a flowchart illustrated in FIG. 2.

In this electrical insulation degradation handling process procedure, firstly, as will be described later, it is confirmed that a detected electrical insulation resistance value Rn detected by the electrical insulation degradation sensor 25 is lower than a setting electrical insulation resistance value Rt that has been preset (step S11) and a running speed Sn of the vehicle 100 detected by the vehicle speed detector 16 is lower than a setting vehicle speed St that has been preset (step S15). After that, a timer 27 provided is counted up (step S17), and in addition, whether or not a preset duration t has been elapsed is confirmed (step S19). When the preset duration t has not been elapsed, processing goes back to step S11 to repeat the same processing. On the other hand, when the preset duration t has been elapsed, it is assumed that an electrical insulation degradation is occurring at a high-voltage part near the high-voltage battery 14 or near the inverter 17, and this state is determined that the power supply cutout is necessary. Then, for example, an alarming unit 29 such as an LED or the like installed on a speed meter panel is lit to give a driver an alarm of executing a power supply cutoff process as a result of the occurrence of an electrical insulation degradation defect (step S13). Subsequently, the main relays 22 and 23 are opened to cut off the supply of the high-voltage power of the high-voltage battery 14 (step S21). After this, the count of the timer 27 is reset to be ready for executing the next electrical insulation degradation handling process program (step S23).

This does not adversely affect the security of the vehicle stability, even if the electric motor 12 is stopped driving. Additionally, the driver of the vehicle 100 is able to recognize the alarm to stop driving the electric motor 12, before the high-voltage power supplied from the high-voltage battery 14 is cut off.

Specifically, the vehicle speed St is considered to be the speed immediately before the vehicle stops. The speed may be set appropriately at, for example, 5 km/h or lower, or the running speed of a creep phenomenon or lower. Specifically, the time t is several seconds. This time is considered to be a value that the vehicle movement is in a stable state.

Thus, as illustrated in FIG. 3, it is made possible to continue running on the driving force of the electric motor 12 without executing the cutout control of the high-voltage power supplied from the high-voltage battery 14, even at a detection timing T1 when detecting the electrical insulation degradation where the detected electrical insulation resistance value Rn is lower than the setting electrical insulation resistance value Rt. Moreover, it is made possible to continue running on the driving force of the electric motor 12, also after a detection timing T2 when detecting that the running speed Sn is equal to or lower than the setting vehicle speed St, which does not cause a problem even if the running is made disabled. After this, after a detection timing T3 when detecting that the preset duration t has been elapsed since the detection timing T2, the cutout control of the supply of the high-voltage power output from the high-voltage battery 14 is executed. For this reason, regardless of the high speed running or regardless of the temporary low speed running, it is possible to avoid execution of the cutout control of the supply of the power from the high-voltage battery 14. It is made possible to avoid execution of the cutout control, although the electrical insulation degradation is falsely detected. This results in that the electrical insulation degradation of the high-voltage part can be detected with high reliability, and the supply of the high-voltage power from the high-voltage battery 14 can be cut off at an early stage. For example, it is made possible to avoid the occurrence of an inconvenience at an early stage, by restricting the development of the degradation after the electric leakage continues at the electrical insulation degradation occurring point of the high-voltage battery 14, as a result of delayed execution of the cutout control.

Additionally, when it is confirmed that the detected electrical insulation resistance value Rn detected by the electrical insulation degradation sensor 25 is not lower than the setting electrical insulation resistance value Rt at step S11, or when the running speed Sn of the vehicle 100 detected by the vehicle speed detector 16 is not lower than the setting vehicle speed St at step S15, processing goes to step S101. The supply of the high-voltage power continues from the high-voltage battery 14 to the electric motor 12 or the high-voltage parts 13 without controlling the main relays 22 and 23 (while maintaining the closed state), and in addition, processing goes to step S23 to reset the counting of the timer 27 and be ready for executing the next electrical insulation degradation handling process program.

Hence, even if both of the electrical insulation degradation detection and the low speed running are satisfied, the high-voltage power supplied from the high-voltage battery 14 to the electric motor 12 or the high-voltage parts 13 will not be cut off promptly, until the certain period t has elapsed.

In this situation, specifically, the electrical insulation degradation sensor 25 is configured to be connected to an electrical insulation resistance r having a high resistance value or a capacitor, not illustrated, between the positive terminal 14a and the negative terminal 14b of the high-voltage battery 14, and a electrical chassis ground G of the vehicle 100, respectively. The electrical insulation degradation sensor 25 measures a potential difference between both ends of the electrical insulation resistance r. The electrical insulation resistance r has the potential difference between its both ends by accumulating electric charge in the capacitor with the current flown by the electrical insulation degradation.

From this fact, in a case where the electrical insulation degradation occurs at one of the positive terminal 14a and the negative terminal 14b of the high-voltage battery 14, the potential difference is generated between both ends of the electrical insulation resistance r, when the electric charge is accumulated in the capacitor of the above one of the positive terminal 14a and the negative terminal 14b. However, since the electric charge is not accumulated in the capacitor of the other of the positive terminal 14a and the negative terminal 14b and the potential difference is not generated between both ends of the electrical insulation resistance r, the controller 15 is capable of detecting that the electrical insulation degradation occurs on the terminal side where there is a potential difference. Additionally, in a case where the electrical insulation degradation occurs at the inverter 17, since this electrical insulation degradation is caused at the alternating voltage, the electric charge is accumulated in both capacitors of the positive terminal 14a and the negative terminal 14b of the high-voltage battery 14 and there is a potential difference between both ends of the electrical insulation resistance r. As indicated by broken lines in the drawing, it is possible to detect that the electrical insulation degradation is occurring at the inverter 17 in the same manner as a case where the electrical insulation degradation sensor 25 is connected. For example, when the electrical insulation degradation occurs at the negative terminal 14b side of the high-voltage battery 14, there is no potential difference at the positive terminal 14a side without the electrical insulation degradation, even in a case where there is a high potential difference at the negative terminal 14b side. In contrast, when the electrical insulation degradation occurs on the inverter 17 side, the potential difference lower than the normal potential difference on both sides of the positive terminal 14a and the negative terminal 14b will be detected.

In this situation, the electrical insulation degradation sensor 25 detects the potential difference between both ends of the electrical insulation resistance r to detect whether or not an electrical insulation degradation occurs. There is a potential difference (v=ir) at this electrical insulation resistance r according to an electrical insulation resistance value, even with the same leakage current. Whether the potential difference is higher or lower than the preset potential difference corresponds to whether the detected electrical insulation resistance value Rn is higher or lower than the setting electrical insulation resistance value Rt that has been preset. In brief, the electrical insulation degradation sensor 25 substantially performs the same process as the measurement of the electrical insulation resistance value. When the electrical insulation degradation occurs at the inverter 17, both ends of the electrical insulation resistance r of the positive terminal 14a and the negative terminal 14b each have a potential difference smaller than that of the case where the electrical insulation degradation occurs at one of the positive terminal 14a and the negative terminal 14b of the high-voltage battery 14.

Therefore, when the electrical insulation degradation sensor 25 detects the potential difference higher than a preset threshold (setting value), the controller 15 detects an occurrence of the electrical insulation degradation with the detected electrical insulation resistance value Rn lower than the setting electrical insulation resistance value Rt. There are two thresholds including: a threshold v1 for detecting that the electrical insulation degradation occurs when comparing with the potential difference generated between both ends of the electrical insulation resistance r on one of the positive terminal 14a side and the negative terminal 14b side of the high-voltage battery 14; and a threshold v2, lower than the threshold v1, for detecting that the electrical insulation degradation occurs on the inverter 17 side when comparing with the potential differences generated between both ends of both electrical insulation resistances r of the positive terminal 14a side and the negative terminal 14b side of the high-voltage battery 14. Specifically, in the present embodiment, the electrical insulation degradation sensor 25 is connected only to the high-voltage battery 14 side to be capable of detecting the electrical insulation degradation on the inverter 17 side. However, the present embodiment is not limited to this. It goes without saying that the electrical insulation degradation sensor should be directly connected to the inverter 17 side to be capable of detecting the electrical insulation degradation for each detection target.

Thus, the controller 15 is capable of detecting on which one of the positive terminal 14a side and the negative terminal 14b side of the high-voltage battery 14 and the inverter 17 side the electrical insulation detection occurs, with a simple configuration at a low cost.

It is to be noted, however, that in the case where the electrical insulation degradation occurs on the inverter 17 side, noise may be generated more easily than the case where the electrical insulation degradation occurs at the positive terminal 14a side or the negative terminal 14b side of the high-voltage battery 14, and thereby leading to error detection. For this reason, by delaying the timing of executing the cutout control of the supply of the high-voltage power from the high-voltage battery 14, the controller 15 confirms that the electrical insulation degradation is occurring in the inverter 17 side at a high degree of certainty, and then executes the cutout control for the supply of the power. Therefore, there are set: a vehicle speed St1 (i.e., first setting speed) to be compared with the running speed Sn in the case where the electrical insulation degradation occurs on one of the positive terminal 14a side and the negative terminal 14b side of the high-voltage battery 14; a vehicle speed St2 (i.e., second setting speed), lower than the vehicle speed St1, to be compared with the running speed Sn in the case where the electrical insulation degradation occurs on the inverter 17 side; a duration t1 (i.e., first setting time) for confirming in the case where the electrical insulation degradation occurs on one of the positive terminal 14a side and the negative terminal 14b side of the high-voltage battery 14; and a duration t2 (i.e., second setting time), longer than the duration t1, for confirming in the case where the electrical insulation degradation occurs on the inverter 17 side.

Accordingly, the controller 15 is capable of detecting with high reliability the electrical insulation degradation occurring on not only the positive terminal 14a side or the negative terminal 14b side of the high-voltage battery 14 but also the inverter 17 side, executing the cutout control of supply of the high-voltage power from the high-voltage battery 14, and performing an appropriate maintenance operation.

In the present embodiment in this manner, when the electrical insulation degradation occurs at the high-voltage battery 14 or on the inverter 17 side, it is possible to detect the electrical insulation degradation with high reliability and to cut off the supply of the power promptly. It is therefore possible to avoid the electrical insulation degradation from being developed while maintaining the state of capable of running until the next running operation, and to cancel the electric leakage state for ensuring the maintenance operation.

Second Embodiment

Figure 4:
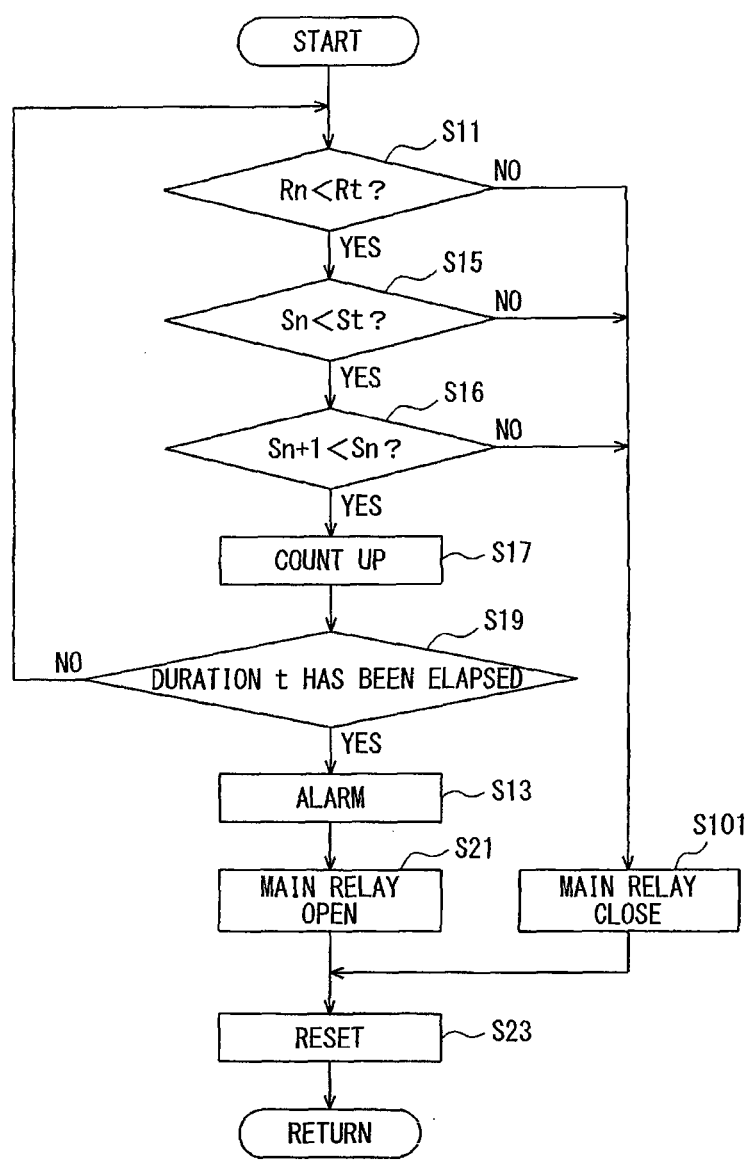
FIG. 4 is a view illustrative of an example of a vehicle equipped with a second embodiment of the vehicle power supply control apparatus according to the present invention, and is a flowchart illustrative of a control process of cutting off the supply of the power.

Next, FIG. 4 is a view illustrative of an example of a vehicle equipped with a second embodiment of the vehicle power supply control apparatus according to the present invention. Herein, since the present embodiment is configured substantially same as the above-described embodiment, substantial parts will be described with the same configurations as those of FIG. 1 applied with the same reference numerals.

In FIG. 1, the controller 15 executes the electrical insulation degradation handling process procedure (process method) in accordance with a flowchart illustrated in FIG. 4.

In this electrical insulation degradation handling process procedure, firstly, it is confirmed that the detected electrical insulation resistance value Rn detected by the electrical insulation degradation sensor 25 is lower than the setting electrical insulation resistance value Rt (step S11) and the running speed Sn of the vehicle 100 detected by the vehicle speed detector 16 is lower than the setting vehicle speed St in a memory 26 (step S15). After that, it is further confirmed that a currently detected running speed Sn+1 is lower than the previously detected running speed Sn remaining in the memory 26 and the vehicle is in a deceleration running state (step S16).

Subsequently to this, when the timer 27 is counted up (step S17), and in addition, it is confirmed that the duration t has elapsed (step S19), it is assumed to detect that the electrical insulation degradation is occurring at a high-voltage part near the high-voltage battery 14 or near the inverter 17. Then, the alarming unit 29 gives a driver an alarm of executing the power supply cutout process (step S13). Subsequently, the main relays 22 and 23 are opened to cut off the supply of the high-voltage power from the high-voltage battery 14 (step S21), and the count of the timer 27 is reset (step S23).

At step S16, when the currently detected running speed Sn+1 is higher than the previously detected running speed Sn in the memory 26, the deceleration running does not continue.

Thus, it is determined that the running operation is continuing, and processing goes to step S101. The supply of the high-voltage power from the high-voltage battery 14 to the electric motor 12 or the high-voltage parts 13 is maintained without controlling the main relays 22 and 23 (while maintaining the closed state), and in addition, processing goes to step S23 to reset the count of the timer 27 for being ready for executing the next electrical insulation degradation handling process program.

In this manner, according to the present embodiment, in addition to the operations and effects in the above-described embodiment, driving of the electric motor 12 is stopped in the decelerating state. Therefore, as compared to a case where driving of the electric motor 12 is stopped in the accelerating state, it is possible to suppress an unexpected shock of a driver. Moreover, when the vehicle makes a stop with further certainty, it is possible to cut off the supply of the power to the high-voltage part.

The scope of the present invention is not limited to the exemplary embodiments that have been illustrated and described, but includes all embodiments that bring equivalent effects that are objects of the present invention. Furthermore, the scope of the present invention is not limited to any combination of the inventions recited in respective claims, and may include any desired combination of all the respective specific characteristics that have been described.

Industrial Availability

Embodiments of the present invention have been described heretofore, but the present invention is not limited to the above-described embodiments. It will be appreciated that the invention should be susceptible of modification, variation and change without departing from the proper scope of the technical concept.

Reference Signs List 11 wheel
12 electric motor
13 high-voltage parts
14 high-voltage battery
14a positive terminal
14b negative terminal
15 controller
16 vehicle speed detector
17 inverter
21 switch
22, 23 main relay
25 electrical insulation degradation sensor
26 memory
27 timer
29 alarming unit
100 vehicle
r electrical insulation resistance

The invention claimed is:

1. A power supply control apparatus mounted in a vehicle having a high-voltage part, for controlling supply of power to the high-voltage part, the power supply control apparatus comprising:
an electrical insulation degradation detector for detecting an electrical insulation degradation of the high-voltage part;
a power supply cutoff unit for cutting off the supply of the power to the high-voltage part;
a vehicle speed detector for detecting a running speed of the vehicle; and
a power supply controller for causing the power supply cutoff unit to cut off the supply of the power to the high-voltage part, when a first power supply cutoff condition and a second power supply cutoff condition are satisfied, the first power supply cutoff condition being that the electrical insulation degradation detector detects the electrical insulation degradation of the high-voltage part, the second power supply cutoff condition being that the running speed of the vehicle detected by the vehicle speed detector is lower than a preset speed.

2. The power supply control apparatus mounted in the vehicle according to claim 1,
further comprising a timer for counting a duration of a state of satisfying the first and second power supply cutoff conditions,
wherein the power supply controller causes the power supply cutoff unit to cut off the supply of the power to the high-voltage part, when a counted time of the timer exceeds a preset time.

3. The power supply control apparatus mounted in the vehicle according to claim 1,
wherein the power supply controller causes the power supply cutoff unit to cut off the supply of the power to the high-voltage part, when a third power supply cutoff condition is satisfied in addition to the first and second power supply cutoff conditions being satisfied, the third power supply cutoff condition being that the running speed of the vehicle detected by the vehicle speed detector is gradually being lowered.

4. The power supply control apparatus mounted in the vehicle according to claim 1,
   wherein the vehicle comprises an inverter for converting a direct current voltage supplied from a direct current power supply into an alternating current voltage, and
   wherein the electrical insulation degradation detector detects the electrical insulation degradation on the direct current power supply side and the electrical insulation degradation on the inverter side, respectively.

5. The power supply control apparatus mounted in the vehicle according to claim 4,
   wherein the power supply controller has a first setting speed of the electrical insulation degradation on the direct current power supply side and a second setting speed of the electrical insulation degradation on the inverter side, as the preset speeds of the second power supply cutoff condition, and
   wherein the second setting speed is lower than the first setting speed.

6. The power supply control apparatus mounted in the vehicle according to claim 4,
   further comprising a timer for counting a duration of a state of satisfying the first and second power supply cutoff conditions,
   wherein the power supply controller has a first setting time of the electrical insulation degradation on the direct current power supply side and a second setting time of the electrical insulation degradation on the inverter side, as the preset time for causing the power supply cutoff unit to cut off the supply of the power to the high-voltage part, when a counted time of the timer exceeds the preset time, and
   wherein the second setting time is longer than the first setting time.

7. The power supply control apparatus mounted in the vehicle according to claim 5,
   further comprising a timer for counting a duration of a state of satisfying the first and second power supply cutoff conditions,
   wherein the power supply controller has a first setting time of the electrical insulation degradation on the direct current power supply side and a second setting time of the electrical insulation degradation on the inverter side, as the preset time for causing the power supply cutoff unit to cut off the supply of the power to the high-voltage part, when a counted time of the timer exceeds the preset time, and
   wherein the second setting time is longer than the first setting time.

* * * * *